United States Patent [19]

Tsukamoto et al.

[11] Patent Number: 5,270,721

[45] Date of Patent: Dec. 14, 1993

[54] PLANAR ANTENNA

[75] Inventors: Katsuya Tsukamoto; Toshio Abiko; Hiroo Inoue; Kaname Okuno, all of Osaka, Japan

[73] Assignee: Matsushita Electric Works, Ltd., Osaka, Japan

[21] Appl. No.: 876,134

[22] Filed: Apr. 29, 1992

Related U.S. Application Data

[63] Continuation of Ser. No. 708,820, May 31, 1991, abandoned, which is a continuation of Ser. No. 509,820, Apr. 17, 1990, abandoned.

[30] Foreign Application Priority Data

May 15, 1989 [JP] Japan ................. 1-121104
Nov. 15, 1989 [JP] Japan ................. 1-297078

[51] Int. Cl.$^5$ ............... H01Q 1/380; H01Q 13/080; H01Q 21/060; H01Q 21/240
[52] U.S. Cl. ...................... 343/700 MS; 343/770
[58] Field of Search ............ 343/700 MS, 829, 846, 343/853, 767, 769, 770

[56] References Cited

U.S. PATENT DOCUMENTS

| | | | |
|---|---|---|---|
| 4,429,313 | 1/1984 | Muhs, Jr. et al. | 343/771 |
| 4,443,802 | 4/1984 | Mayes | 343/770 |
| 4,475,107 | 10/1984 | Makimoto et al. | 343/700 MS |
| 4,614,947 | 9/1986 | Rammos | 343/778 |
| 4,626,865 | 12/1986 | Rammos | 343/786 |
| 4,761,654 | 8/1988 | Zaghloul | 343/700 MS |
| 4,816,835 | 3/1989 | Abiko et al. | 343/700 MS |
| 4,851,855 | 7/1989 | Tsukamoto et al. | 343/700 MS |
| 4,857,938 | 8/1989 | Tsukamoto et al. | 343/700 MS |
| 4,899,162 | 2/1990 | Bayetto et al. | 343/700 MS |
| 4,922,263 | 5/1990 | Dubost et al. | 343/700 MS |
| 4,929,959 | 5/1990 | Sorbello et al. | 343/700 MS |
| 4,977,406 | 12/1990 | Tsukamoto et al. | 343/700 MS |
| 5,005,019 | 4/1991 | Zaghloul et al. | 343/700 MS |

OTHER PUBLICATIONS

Haneishi et al., Study on Ellipticity Properties of Single-Feed-Type Circularly Polarized Microstrip Antennas, Electronics Letters, Mar. 4, 1982, vol. 18, No. 5, pp. 191-193.

*Primary Examiner*—Rolf Hille
*Assistant Examiner*—Peter Toby Brown
*Attorney, Agent, or Firm*—Burns, Doane, Swecker & Mathis

[57] ABSTRACT

A planar antenna includes a grounding conductor plate, a power supply plate having a pattern of power supplying conductor strips each including power supply terminals, and a radiation plate having apertures forming radiation elements, the respective plates being arranged sequentially with an insulating layer interposed between adjacent ones of the plates to separate them to be independent of one another through a predetermined interval, while coupling electromagnetically the respective power supplying terminals of the power supplying conductor pattern on the power supply plate to the radiation elements provided as the apertures in the radiation plate. With this simplified arrangement, the planar antenna makes it possible to receive at a high gain circularly polarized waves over a wide range.

12 Claims, 6 Drawing Sheets

PLANAR ANTENNA

This application is a continuation of application Ser. No. 07/708,820 filed May 31, 1991, now abandoned; which is a continuation of application Ser. No. 07/509820, filed Apr. 17, 1990, now abandoned.

BACKGROUND OF THE INVENTION

This invention relates to planar antennas and, more particularly, to a planar antenna capable of receiving circularly polarized waves at a high gain over a wide band.

The planar antennas of the kind referred to are effectively utilized in receiving the circularly polarized waves transmitted as carried on SHF band, in particular, above 12 GHz band from a geostationary broadcasting satellite launched into cosmic space to be 36,000 Km alone from the earth.

1. Field of the Invention

Parabolic antennas erected on the roof or the like positions of house buildings have been generally widely utilized as the antenna for receiving the circularly polarized waves from the geostationary satellite, but parabolic antennas have been defective in that they are susceptible to strong wind and easily fall down due to their bulky three dimensional structure so that additional means for stably supporting them will have to be employed, and that such supporting means further requires high mounting costs and still troublesome installation labor.

2. Description of the Related Art

In attempt to eliminate these problems of the known parabolic antennas, there has been suggested in Japanese Patent Application Laid-Open publication No. 99803/1978 (or corresponding U.S. Pat. No. 4,475,107 or German Offenlegungsschrift No. P 314900.2) a planar antenna which is flattened in the entire configuration, according to which the structure can be much simplified and it is made possible to directly mount the antenna on an outdoor wall or the like position of house buildings so as to be made inexpensive.

Further, the planar antenna has been demanded to be of a high gain, for which purpose various attempts have been made to reduce insertion loss. Disclosed in, for example, U.S. Pat. No. 4,851,855 of the present inventors, K. Tsukamoto et al. (to which U.K. Patent No. 2,187,333, German Patent Application P 37 06 051.1 and French Patent Application No. 87 02421 correspond) prior to the present invention is a planar antenna in which the power supply circuit and the radiation circuit are not connected directly to each other but are electromagnetically coupled for supplying a power from the power supply circuit to the radiation circuit, while both circuits as well as a grounding conductor are respectively carried on each of insulating plates which are separated from one another by means of a space retaining means. With this arrangement, the power supply circuit can be also disposed in the space thus retained, and the insertion loss can be effectively reduced.

Further, prior to the present invention, there has been suggested in U.S. Pat. No. 4,816,835 of T. Abiko et al. (to which U.K. Patent Application No. 87 19750, German Patent Application P 37 29 750 and French Patent Application No. 87 12274 correspond) another planar antenna in which a radiation circuit is provided with many slots in which each of the patch elements is disposed, and such radiation circuit is electromagnetically coupled at the patch elements in the slots to opposed power supply terminals of a power supply circuit, so as to further decrease the insertion loss while incrementally improving the assembling ability.

According to these U.S. Pat. Nos. 4,851,855 and 4,816,835, it is possible to reduce the insertion loss of the planar antennas and to improve them in the assembling ability in contrast to any known planar antennas. In these patents, however, the radiation circuit comprises slots of a square, circular or other shape and patch elements respectively disposed in each of the slots in the form of a floating island so that a highly precise etching process will be required therefor with required etching pattern of the radiation plate made much complicated, and there have arisen such problems that manufacturing fluctuation becomes large to lower the yield or resultant products and required manufacturing costs are generally elevated.

SUMMARY OF THE INVENTION

A primary object of the present invention is, therefore, to provide at very low costs a planar antenna of, in particular, a simplified structure in the radiation plate so that no high precision manufacturing is required, radiation surface pattern is also simplified remarkably, the producibility is thereby much improved and a high gain is obtained over a wide band.

According to the present invention, this object can be realized by a planar antenna in which a grounding conductor plate, power supply plate and radiation plate are sequentially arranged with an insulating layer interposed between adjacent ones of the plates to separate them to be independent of one another through a predetermined interval, the power supply plate comprising a pattern of power supplying conductor strips each including power supply terminals, and the radiation plate comprising radiation elements respectively coupled electromagnetically to each of the power supply terminals for receiving circularly polarized waves transmitted back from a broadcasting satellite as carried on SHF band, characterized in that the radiation elements of the radiation plate are apertures of a contour varied to be irregular for a higher efficient gain of the circularly polarized waves at edge parts corresponding to positions inclined substantially by 45 degrees with respect to an abscissa passing through the center of the aperture.

According to the planar antenna in the foregoing arrangement of the present invention, the radiation plate is provided as the radiation elements only with the apertures of such unique contour as specified, without employing such arrangement of the patch elements within the respective slots as in the known radiation plate, so that the structure can be simplified while reducing the Q value, and the high gain is attainable over a wide band.

Other objects and advantages shall be made clear in following description of the invention with reference to preferred embodiments shown in accompanying drawings.

While the present invention shall now be described with reference to the embodiments shown in the accompanying drawings, it should be appreciated that the intention is not to limit the invention only to these embodiments shown but to rather include all modifications, alterations and equivalent arrangements possible within the scope of appended claims.

DETAILED DESCRIPTION OF THE PREFERRED EMBODIMENTS

Figure 1:
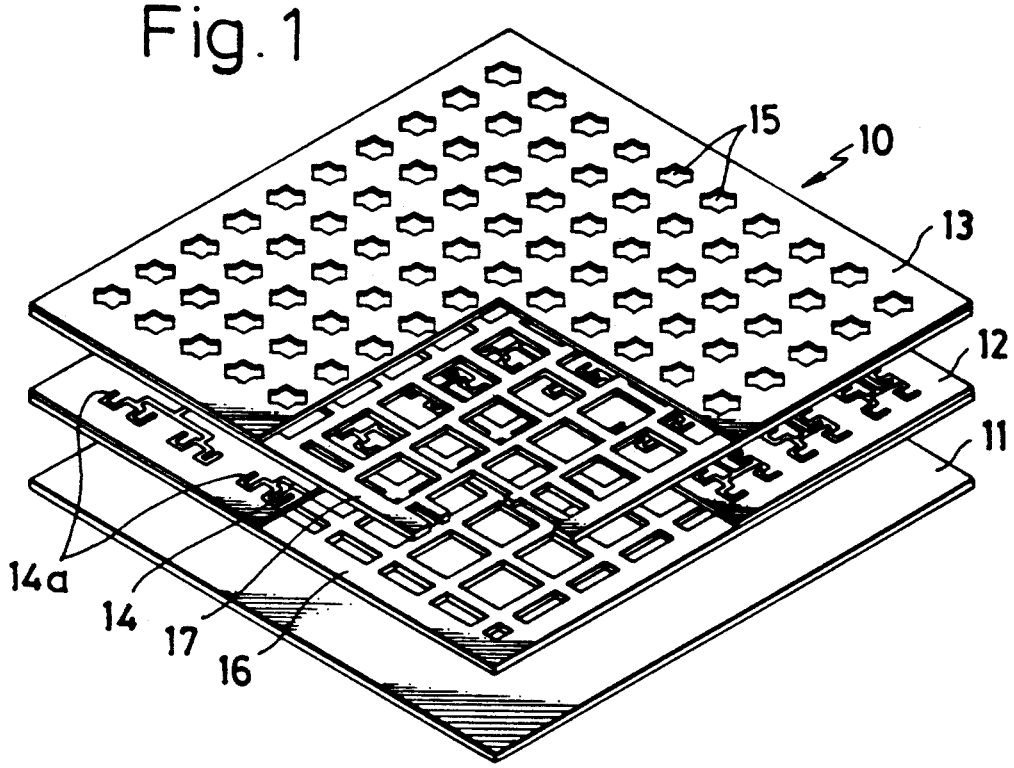
FIG. 1 is a perspective view as disassembled of the planar antenna in an embodiment of the present invention, with certain parts of its constituents shown as omitted for easier understanding.
Figure 3:
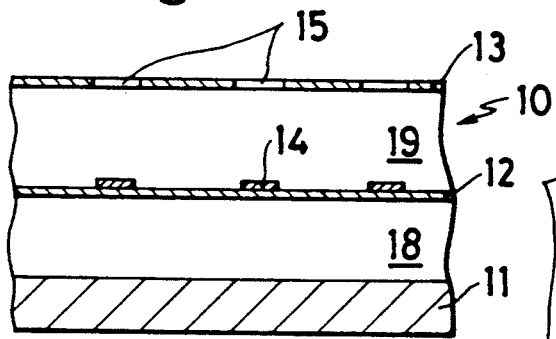
FIG. 3 is a fragmentary cross section as magnified of the planar antenna of FIG. 1.
Figure 2:
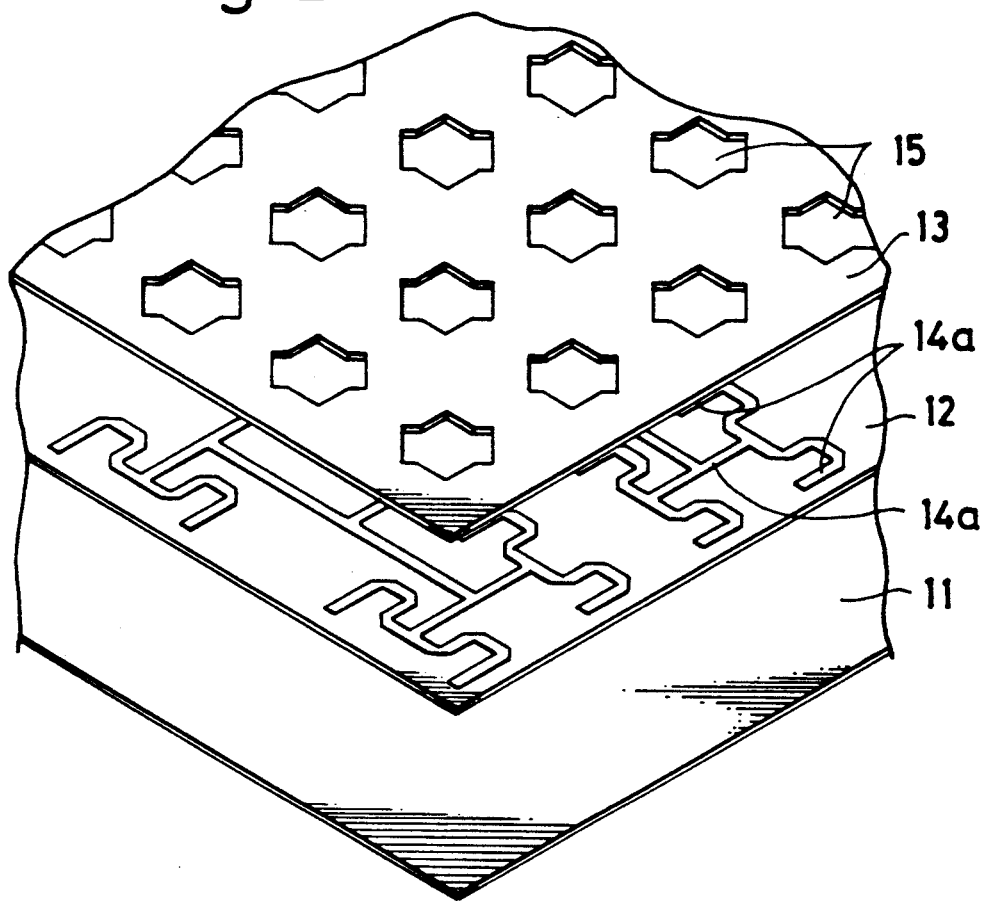
FIG. 2 is a fragmentary perspective view as magnified of the planar antenna of FIG. 1.

Referring first to FIGS. 1 to 3 showing a planar antenna 10 in an embodiment according to the present invention, this planar antenna 10 comprises a grounding conductor plate 11, a power supply plate 12 and a radiation plate 13, which plates are sequentially stacked with an insulating layer interposed between them so as to be independent of each other through a predetermined interval. The grounding conductor plate 11 is formed by such electrically conducting material as aluminum, copper, silver, astatine, iron, gold or the like. The power supply plate 12 comprises a pattern 14 of power supplying conductor strips formed by such conducting material as copper, aluminum, silver, astatine, iron, gold or the like, preferably, the pattern being provided through an etching process on a synthetic resin sheet prepared with one alone or a mixture of two or more of, for example, polyethylene, polypropylene, polyester, acrylic resin, polycarbonate, ABS resin and PVC resin. The radiation plate 13 is prepared by forming through a punching a plurality of apertures 15 made as the radiation elements preferably in an aluminum sheet.

Between the grounding conductor plate 11 and the power supply plate 12 and between the power supply plate 12 and the radiation plate 13, such retaining means as spacers 16 and 17 formed with, for example, a synthetic resin, preferably a foamed resin in a lattice formation are interposed, so as to define there between spaces 18 and 19. Here, a gas, in particular, air allowed to flow into these spaces 18 and 19 is to function as a low loss dielectric.

Figure 4:
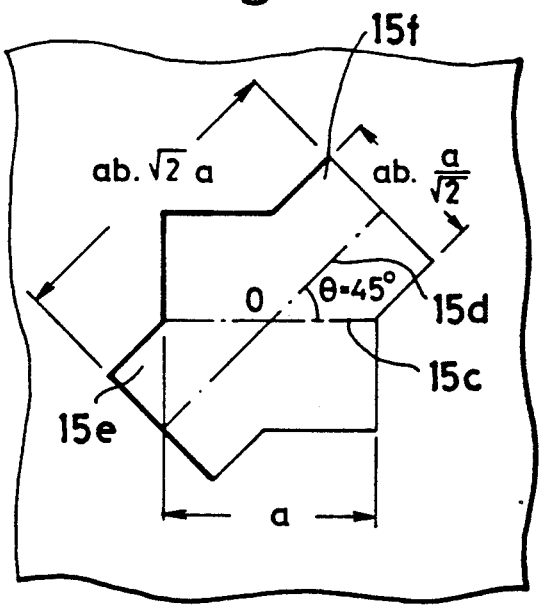
FIG. 4 is a fragmentary plan view as magnified of an aperture in the radiation plate of the planar antenna shown in FIG. 1.
Figure 5:
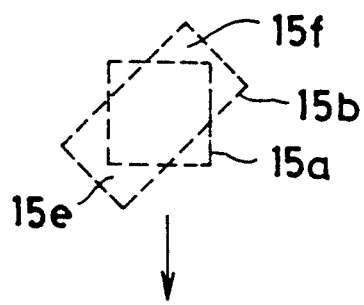
FIG. 5 is an explanatory view for the aperture of the planar antenna in FIG. 1.

More specifically, the conductor strip pattern 14 of the power supply plate 12 is formed to have a number of power supply terminals 14a for the reception of the circularly polarized waves from the satellite. On the other hand, the apertures 15 formed in the radiation plate 13 are so provided as to respectively oppose each of the power supply terminals 14a of the power supply plate 12 to be coupled electromagnetically to them. As can be seen from the drawings, the apertures 15 define a boundary of a space wherein the space is free of patch elements, like those shown in U.S. Pat. Nos. 4,851,855 and 4,816,835 mentioned above, within a zone of the electromagnetic coupling of each aperture with each power supply terminal. In this case, as will be clearly seen in FIGS. 4 and 5, the apertures 15 are provided respectively to be of a composite contour of a square shape 15a of a side dimension "a" (for example, a=12.5 mm) and a rectangular shape 15b of a longitudinal (or short side) side dimension of about 2a and a latitudinal side (or long side) dimension of about $a/\sqrt{2}$, which two shapes 15a and 15b being so combined that their center points are aligned with each other and the rectangular shape 15b is so superposed on the square shape 15a as to be inclined by 45 degrees at longitudinal axis 15d of the rectangular shape 15b with respect to an horizontal axis 15c of the square shape 15a passing through its center O. In each aperture 15, therefore, the contour is made irregular at edge parts corresponding to positions inclined substantially by 45 degrees with respect to the horizontal axis 15c passing the center, as expanded in the direction of the inclination of 45 degrees. In other words, the square shape 15a is made to have enlarged parts 15e and 15f at diagonally symmetrical positions in the direction of the 45 degrees inclination. In order to attain a satisfactory gain, it is preferable that the radiation plate 13 is formed to have the apertures 15 provided through a punching to be 16 rows and 16 columns at intervals of 2 mm.

Figure 6:
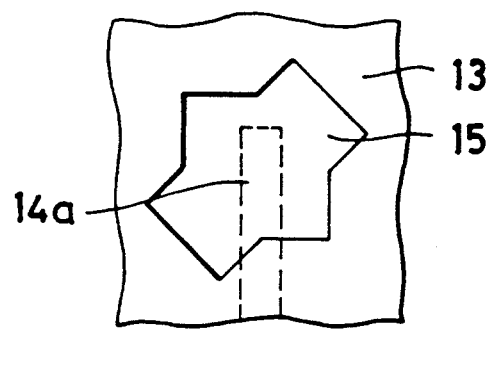
FIG. 6 is an explanatory view for the relationship of the aperture of the radiation plate to the power supply terminal of the power supply plate in the planar antenna of FIG. 1.

For an effective electromagnetic coupling between the power supply terminals 14a of the power supply plate 12 and the apertures 15 in the radiation plate 13, it is sufficient to have the power supply terminal 14a extended to slightly pass over the center O of the aperture 15 in their plan view, as shown in FIG. 6. Taking into account that the antenna is installed outdoors, a radome permeable to waves as made mainly of a foamed plastic material may be provided to cover, if required, a front antenna face of the radiation plate for its protection.

Figure 7:
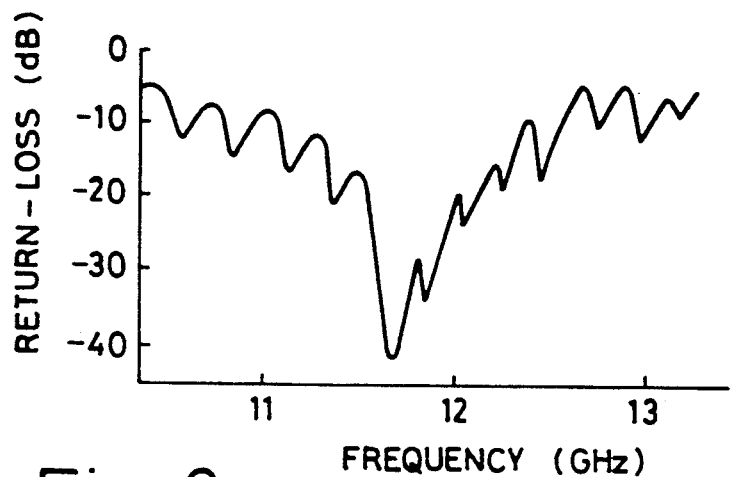
FIG. 7 is a diagram showing the relationship between the frequency and the return-loss in the planar antenna of FIG. 1.
Figure 8:
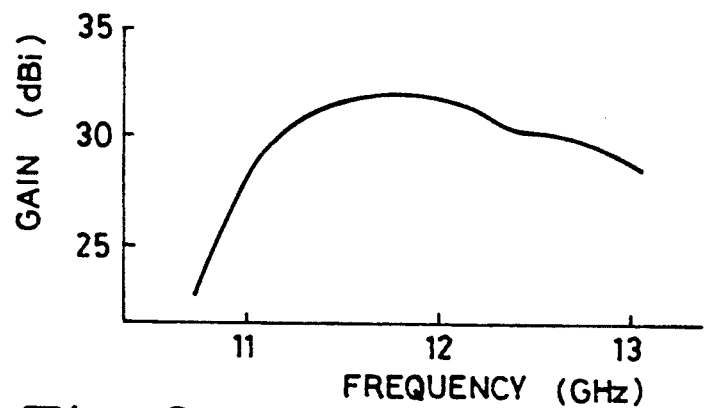
FIG. 8 is a diagram showing the relationship between the frequency and the gain in the planar antenna of FIG. 1.
Figure 9:
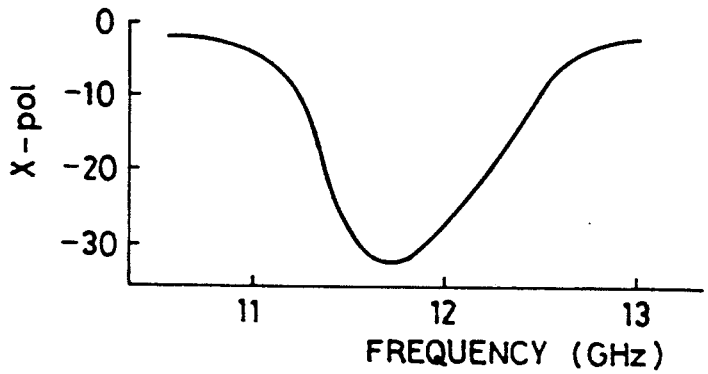
FIG. 9 is a diagram showing the relationship between the frequency and the cross polarization characteristics in the planar antenna of FIG. 1.

It has been found that, with the planar antenna according to the present invention as has been described, the return loss is reduced as shown in FIG. 7, such high gain as shown in FIG. 8 can be attained and excellent cross polarization characteristics are shown as seen in FIG. 9, particularly over a band about 700 MHz, from about 11.5 GHz to about 12.2 GHz. It has been further found that, with the arrangement in which the apertures 15 are formed by punching the aluminum plate as the radiation elements of the radiation plate as in the foregoing embodiment, the planar antenna can be remarkably improved in the manufacturing ability and structural simplicity as compared with such planar antenna as has been disclosed in, for example, the foregoing U.S. Pat. No. 4,816,835, and that the planar antenna can be provided with a high strength by means of the aluminum plate utilized.

Figure 10:
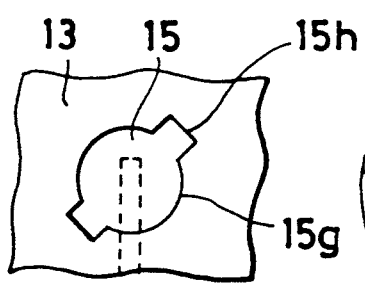
FIG. 10 is a fragmentary plan view as magnified of the aperture in another aspect to be employed in the planar antenna of FIG. 1.

Further, it may be possible to provide the apertures 15 of the radiation plate 13 to be of such a contour as shown in FIG. 10 which is a composite of a circular shape 15g and a rectangular shape 15h overlapped to align their center points and to incline the longitudinal axis passing through the center point of the rectangular shape by 45 degrees with respect to the horizontal axis passing through the center point (or horizontal diameter) of the circular shape 15g. In the present instance, a planar antenna has been prepared with the apertures formed in 16 lines and 16 columns and respectively in such dimension that the circular shape 15g was of a diameter of 8 mm and the rectangular shape 15h was of a longitudinal length of 10 mm and a latitudinal length of 5 mm while other arrangements were made the same as those in the embodiment of FIGS. 1-3. This planar antenna has shown the same characteristics as the planar antenna of FIGS. 1-3. What is demanded here for the apertures as the radiation elements is that their contour is varied or made irregular at the edge parts corresponding to inclined positions substantially by 45 degrees with respect to the horizontal axis passing through the center for the highly efficient gain of the circularly polarized waves, in particular, that the contour is enlarged in radial directions with respect to the center of the aperture, and the provision of the apertures of such contour to the radiation plate will allow satisfactory characteristics as the radiation element to be attained irrespective of whether the aperture contour is a composite of the square, rectangle, circle or any other shape.

In addition, the embodiment of FIGS. 1-3 may be subjected to various design modifications. While in the foregoing embodiment the aluminum plate is employed only for the radiation plate, the aluminum plate can be also employed for the power supply plate 12 as subjected to a punching for providing the power supply terminals, and a further strengthening of the planar antenna can be thereby realized. Further, while in the foregoing embodiment the aluminum plate is used for the radiation plate, it is also possible to use the same synthetic resin sheet as that employed in the power supply plate 12 so long as a conducting foil having the apertures formed through an etching process or the like on the resin sheet, so that an excellent planar antenna similar to the embodiment of FIGS. 1-3 in respect of the characteristics can be obtained, though this antenna is somewhat deteriorated in the manufacturing ability.

Referring here to FIGS. 11-14, there is shown a planar antenna 50 in another embodiment according to the present invention, in which equivalent members to those in the embodiment of FIGS. 1-3 are denoted by the same reference numerals as those used in FIGS. 1-3 but added by 40. In the present embodiment, the pattern 54 of the power supplying conductor strips of the power supply plate 52 is formed to include a plurality of pairs of power supply terminals 54a and 54b which are arranged for performing the power supply mutually at a phase difference of 90 degrees. That is, in each pair, one power supply terminal 54a extends in a U-shape from an end of each T-shaped branch 54c and the other power supply terminal 54b extends in an L-shape from the other opposite end of the T-shaped branch 54c. The radiation plate 53 is formed by an aluminum plate subjected to the punching so as to form apertures of substantially the same contour as that of the apertures 15 shown in FIGS. 4 and 5 but, in the present instance, the apertures are provided also in pairs 55a and 55b to correspond to the paired power supply terminals 54a and 54b of the power supply plate 52. In each pair of the apertures 55a and 55b, they are made generally in mirror symmetric relationship to each other so that their longitudinal axis 55d, inclined in such manner as has been described with reference to FIGS. 4 and 5, will intersect each other at an angle $\theta$ and the horizontal axes of the both apertures 55a and 55b in the respective pairs are mutually deviated so that the abscissa of the aperture 55b will be slightly disposed above that of the other aperture 55a in FIG. 14, that is, in the direction perpendicular to the horizontal axis. With this arrangement, the apertures 55b in the respective pairs of the radiation elements are disposed as rotated by 90 degrees in rotating direction of the polarization plane for the circularly polarized waves with respect to the apertures 55a in the pairs of the radiation elements, and the respective pairs of the power supply terminals 54a and 54b are disposed to extend to a position slightly over the center point of the respective apertures 55a and 55b in the pairs, as viewed in the plan view of FIG. 14, so as to be mutually coupled electromagnetically.

In the present embodiment as in the above, other arrangement and function are the same as those in the embodiment of FIGS. 1-3, except for the 90 degrees phase difference between the power supply terminals 54a and 54b in the respective pairs and the 90 degrees rotation in the rotating direction of the circular polarization plane between the apertures 55a and 55b in the respective pairs for the reception of the circularly polarized waves without interference.

Figure 15:
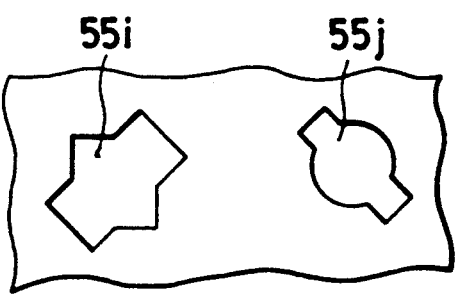
FIG. 15 is a fragmentary plan view as magnified of the apertures of the radiation plate in another aspect employable in the planar antenna of FIG. 11.

For the apertures to be formed in pairs in the radiation plate 53, it is also possible to employ such pairs as shown in FIG. 15 of apertures 55i with the composite contour of the square and rectangular shapes and apertures 55j of the composite contour of the circular and rectangular shapes. It may be also possible to have the apertures 55j of the composite contour of the circular and rectangular shapes rotated by 90 degrees in the rotating direction of the circular polarization plane, and to have such apertures 55i and 55j disposed alternately.

Figure 11:
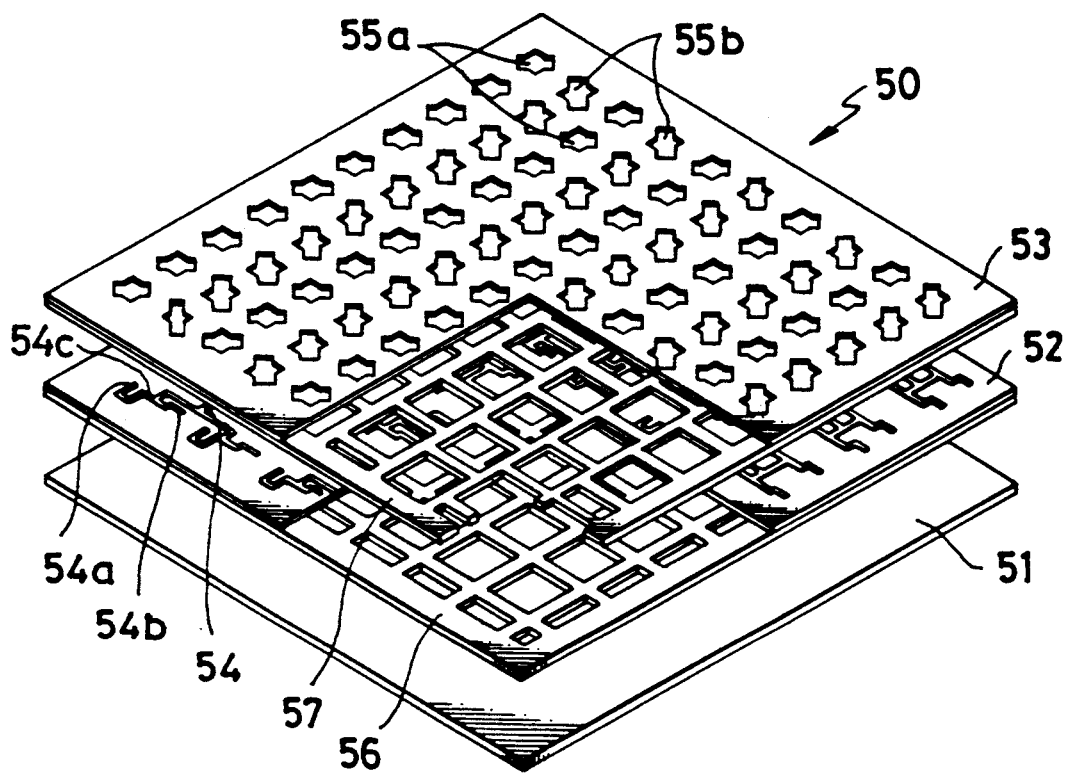
FIG. 11 is a perspective view as disassembled of the planar antenna in another embodiment according to the present invention, with certain parts of its constituents shown as omitted for easier understanding.
Figure 13:
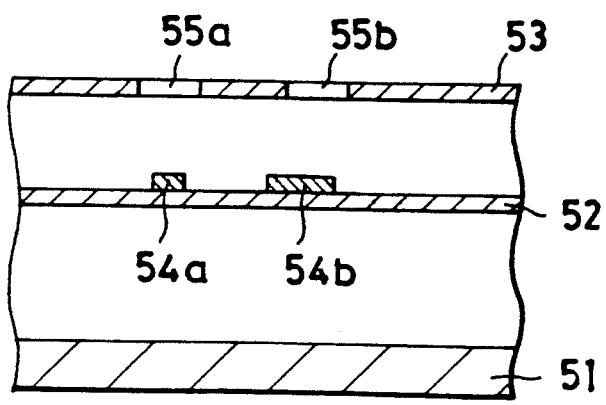
FIG. 13 is a fragmentary cross sectioned view of the planar antenna in FIG. 11.
Figure 12:
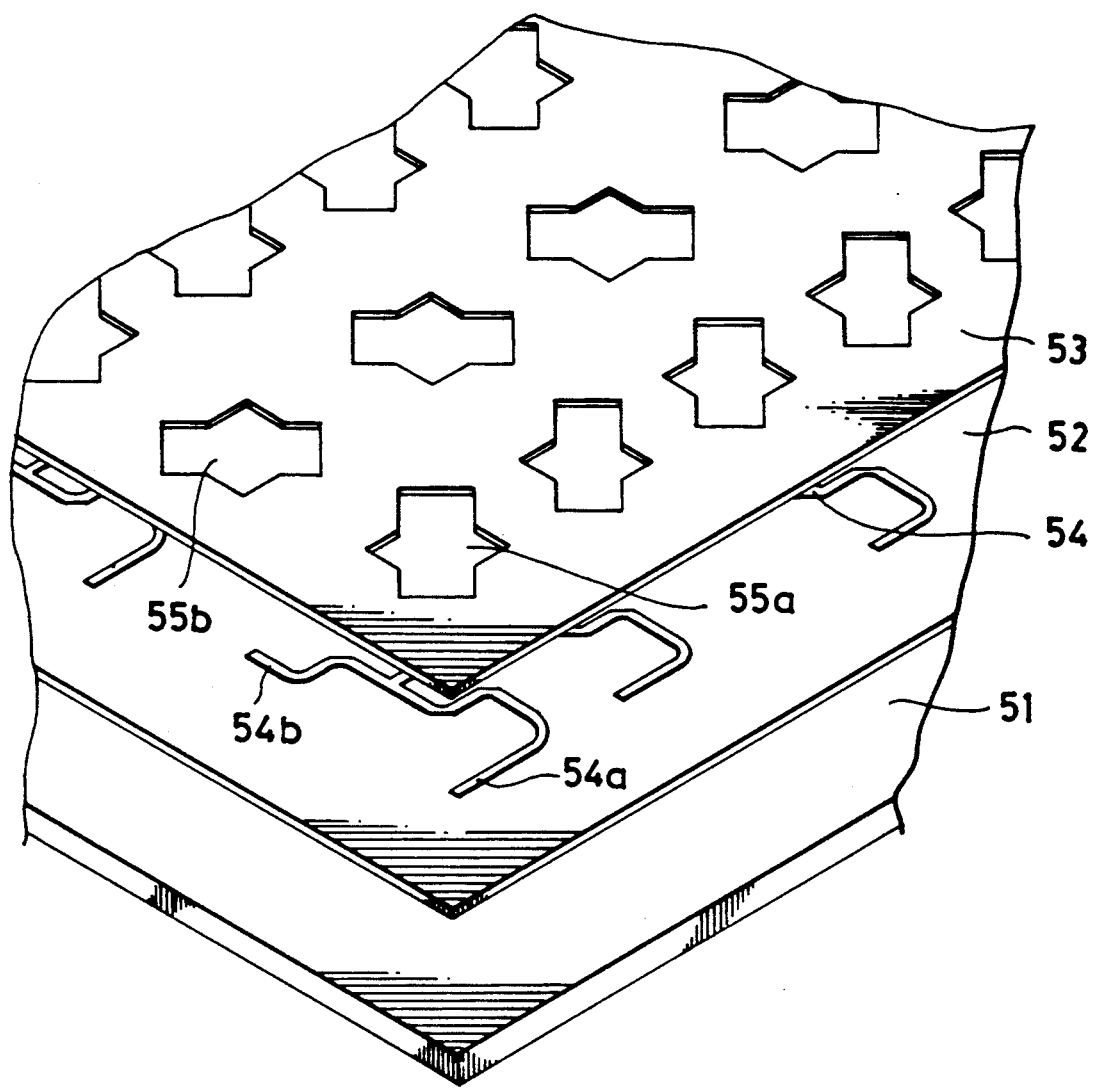
FIG. 12 is a fragmentary perspective view as magnified of the planar antenna of FIG. 11.
Figure 14:
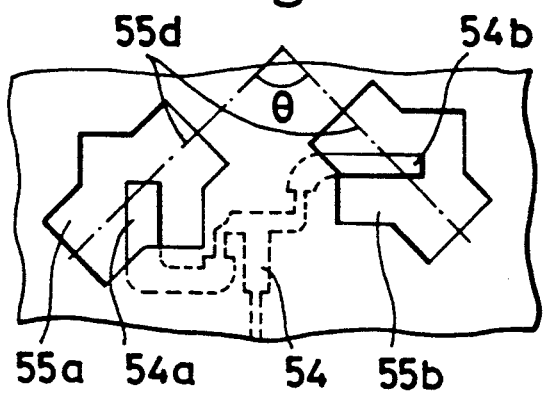
FIG. 14 is an explanatory view for the relationship between the power supply terminals of the power supply plate and the apertures of the radiation plate in the planar antenna of FIG. 11.
Figure 16:
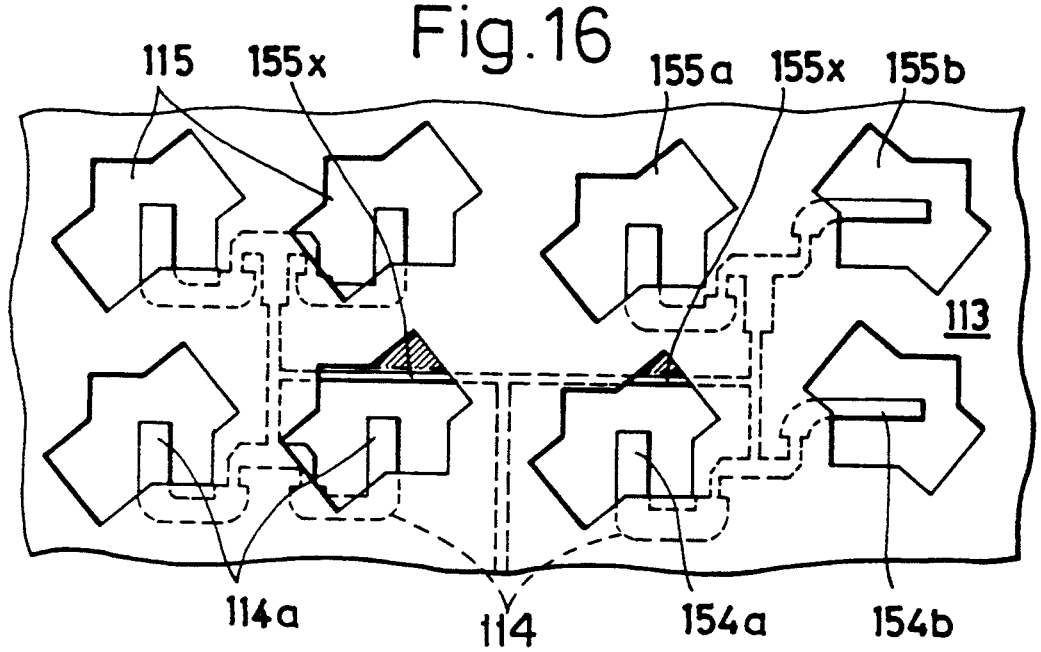
FIGS. 16 and 17 are fragmentary plan views as magnified of the planar antenna in further different embodiments according to the present invention.

Further, such planar antenna as shown in FIG. 16 will be also provided according to the present invention, in which the power supplying conductor pattern 114 including the same power supply terminals 114a as those 14a in FIGS. 1-3 and the same paired power supply terminals 154a and 154b as those 54a and 54b in FIGS. 11-14 is formed in the power supply plate, while the radiation plate 113 is formed to have the same apertures 115 as those 15 shown in FIGS. 1-3 and the same apertures 155a and 155b in pairs as those 55a and 55b in pairs of FIGS. 11-13, the respective apertures 115, 155a and 155b being disposed to oppose the power supply terminals 114a, 154a and 154b for the electromagnetic coupling. It has been proved that the antenna efficiency is improved by this arrangement of the planar antenna of FIG. 16, in which embodiment all other constituents and their functions are the same as those in the foregoing embodiment of FIGS. 1-3.

Figure 17:
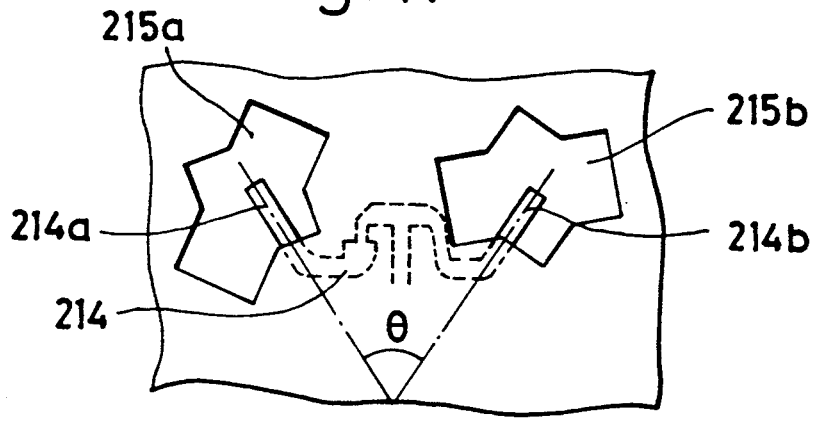

Further, as shown in FIG. 17, the present invention can also realize such a planar antenna in which the power supplying conductor pattern 214 is provided to comprise paired power supply terminals 214a and 214b made for the power supply mutually with the phase difference of 45 degrees, and the radiation plate 213 is made to comprise paired apertures 215a and 215b disposed to oppose these power supply terminals 214a and 214b and mutually with the rotation of 45 degrees in the rotating direction in the circular polarization plane. This embodiment of FIG. 17 has also proved that the same characteristics as in the foregoing embodiments can be thereby arranged. In the present instance, other constituents and functions are also the same as those in the foregoing embodiment of FIGS. 1-3.

In the planar antenna according to the present invention, additionally, it is desirable to provide a measure for eliminating such a risk that some other parts of the power supplying conductor pattern, for example, the power supply terminals (for example, parts denoted by 155x in FIG. 16) are caused to be exposed through the apertures of the radiation plate as seen in the plan view by the deviated disposition between the paired apertures, so as to yield a re-radiation at such parts, and the measure will be to close corresponding portions (shown as hatched in FIG. 16) of the diagonally expanded parts of the apertures. It is optimum that this measure for preventing the re-radiation is taken particularly at the root or central portions of the power supplying conductor pattern where the received energies at the terminals are accumulated.

What is claimed is:

1. A planar antenna consisting essentially of:
a grounding conductor plate;
a power supply plate disposed a predetermined distance from said grounding conductor plate,
said power supply plate provided with a pattern of power supplying conductor strips including a plurality of power supply terminals;
a first insulating layer disposed between said grounding conductor plate and said power supply plate;
a radiation plate disposed a predetermined distance from said power supply plate,
said radiation plate made of a radiation plate material and defining a plurality of apertures, each of said plurality of apertures being electromagnetically coupled to a corresponding power supply terminal and forming a radiation element, and
each of said apertures having a contour of formed by superimposing a first geometric shape and a rectangle and without any patch element within a zone of said electromagnetic coupling of each aperture to each power supply terminal with no other conductive layers above said radiation plate; and
a second insulating layer disposed between said radiation plate and said power supply plate.

2. The antenna according to claim 1, wherein said first geometric shape is substantially a square.

3. The antenna according to claim 1, wherein the first geometric shape is substantially a circle.

4. A planar antenna consisting essentially of:
a grounding conductor plate;
a power supply plate disposed a predetermined interval from said grounding conductor plate with an insulating layer interposed so that the grounding conductor plate and the power supply plate are independent of each other, said power supply plate being provided with a pattern of power supplying conductor strips including power supply terminals, and
a radiation plate made of a radiation plate material and disposed a predetermined interval from said power supply plate with an insulating layer interposed so that the radiation plate and the power supply plate are independent of each other, said radiation plate being provided with apertures forming radiation elements each of which is coupled electromagnetically to a corresponding one of said power supply terminals of said power supply plate, each of said apertures being without any patch element within a zone of said electromagnetic coupling of each aperture to each power supply terminal and having an edge line being varied at diagonally opposing parts to be irregular in a radial direction with respect to a center of each aperture for a higher efficient gain of circularly polarized waves, a diagonal line on which said diagonally opposing parts oppose being inclined substantially by 45 degrees with respect to a latitudinal line passing through the center of the aperture with no other conductive layers above said radiation plate.

5. The antenna according to claim 1 wherein said edge line of said apertures is of a composite shape of a square and a rectangle overlapped with their centers aligned, said rectangle being inclined at said diagonal line by 45 degrees with respect to said latitudinal line passing the center of opposing sides of said square, and said diagonally opposing parts are defined by said inclined rectangle.

6. The antenna according to claim 1 wherein said edge line of said apertures is of a composite shape of a square and a rectangle overlapped with their centers aligned, said rectangle being inclined at said diagonal line by about 45 degrees with respect to said latitudinal line passing the center of said circle, and said diagonally opposing parts are defined by said inclined rectangle.

7. A planar antenna comprising
a grounding conductor plate,
a power supply plate disposed a predetermined interval from said grounding conductor plate with an insulating layer interposed so that the grounding conductor plate and the power supply plate are independent of each other, said power supply plate being provided with a pattern of power supplying conductor strips including power supply terminals, and
a radiation plate made of a radiation plate material and disposed a predetermined interval from said power supply plate with an insulating layer interposed so that the radiation plate and the power supply plate are independent of each other, said radiation plate being provided with apertures forming radiation elements each of which is coupled electromagnetically to a corresponding one of said power supply terminals of said power supply plate, each of said apertures being without any patch element within a zone of said electromagnetic coupling of each aperture to each power supply terminal and having an edge line being varied at diagonally opposing parts to be irregular in a radial direction with respect to a center of each aperture for a higher efficient gain of circularly polarized waves, a diagonal line on which said diagonally opposing parts oppose being inclined substantially by 45 degrees with respect to a latitudinal line passing through the center of the aperture wherein said edge line of said apertures is of a composite shape of a square and a rectangle overlapped with their centers aligned, said rectangle being inclined at said diagonal line by 45 degrees with respect to said latitudinal line passing the center of opposing sides of said square, and said diagonally opposing parts are defined by said inclined rectangle and wherein, when said square of said composite shape of said edge line of said apertures is made to have a side of a dimension of "a", said rectangle is dimensioned to have a longer side of about $\sqrt{2}a$ and a shorter side of about $a/\sqrt{2}$.

8. A planar antenna consisting essentially of:

a grounding conductor plate;

a power supply plate disposed a predetermined interval from said grounding conductor plate with an insulating layer interposed so that the grounding plate and the power supply plate are independent of each other, said power supply plate being provided with a pattern of power supplying conductor strips including a plurality of pairs of power supply terminals for supplying power with a mutual phase difference, and a radiation plate made of a radiation plate material and disposed a predetermined interval from said power supply plate with an insulating layer interposed so that the radiation plate and the power supply plate are independent of each other, said radiation plate being provided with a plurality of pairs of apertures forming radiation elements which are coupled electromagnetically with said pairs of power supply terminals of said power supply plate, each of said apertures being without any patch elements within a zone of said electromagnetic coupling of each aperture to each power supply terminal and having an edge line being varied at diagonally opposing parts to be irregular in radial direction with respect to a center of the aperture for a higher efficient reception gain of circularly polarized waves, diagonal lines on which said diagonally opposing parts oppose being inclined substantially by ±45 degrees with respect to latitudinal line passing through the center of the aperture, and said apertures in each pair being disposed to be mutually rotated at said diagonal lines of the diagonally opposing parts by an angle in a rotating direction of a circular polarization plane with no other conductive layers above said radiation plate.

9. The antenna according to claim 8 wherein said phase difference between said power supply terminals in each said pairs is made 90 degrees, and said apertures in each of said pairs are mutually rotated by 90 degrees.

10. The antenna according to claim 8 wherein said power supplying conductor pattern of said power supply plate includes power supply terminals for power supply without said phase difference, and said radiation plate includes apertures wherein said angle is substantially zero to correspond to said power supply terminals without the phase difference.

11. A planar antenna comprising:

a grounding conductor plate;

a power supply plate disposed a predetermined interval from said grounding conductor plate with an insulating layer interposed so that the grounding plate and the power supply plate are independent of each other, said power supply plate being provided with a pattern of power supplying conductor strips including a plurality of pairs of power supply terminals for supplying power with a mutual phase difference, and a radiation plate made of a radiation plate material and disposed a predetermined interval from said power supply plate with an insulating layer interposed so that the radiation plate and the power supply plate are independent of each other, said radiation plate being provided with a plurality of pairs of apertures forming radiation elements which are coupled electromagnetically with said pairs of power supply terminals of said power supply plate, each of said apertures being without any patch elements within a zone of said electromagnetic coupling of each aperture to each power supply terminal and having an edge line being varied at diagonally opposing parts to be irregular in radial direction with respect to a center of the aperture for a higher efficient reception gain of circularly polarized waves, diagonal lines on which said diagonally opposing parts oppose being inclined substantially by ±45 degrees with respect to a latitudinal line passing through the center of the aperture, and said apertures in each pair being disposed to be mutually rotated at said diagonal lines of the diagonally opposing parts by an angle in a rotating direction of a circular polarization plane, wherein said phase difference between said power supply terminals in each said pairs is made 45 degrees, and said apertures in each said pairs are mutually rotated by 45 degrees.

12. A planar antenna comprising:

a grounding conductor plate;

a power supply plate disposed a predetermined interval from said grounding conductor plate with an insulating layer interposed so that the grounding plate and the power supply plate are independent of each other, said power supply plate being provided with a pattern of power supplying conductor strips including a plurality of pairs of power supply terminals for supplying power with a mutual phase difference, and a radiation plate made of a radiation plate material and disposed a predetermined interval from said power supply plate with an insulating layer interposed so that the radiation plate and the power supply plate are independent of each other, said radiation plate being provided with a plurality of pairs of apertures forming radiation elements which are coupled electromagnetically with said pairs of power supply terminals of said power supply plate, each of said apertures being without any patch elements within a zone of said electromagnetic coupling of each aperture to each power supply terminal and having an edge line being varied at diagonally opposing parts to be irregular in radial direction with respect to a center of the aperture for a higher efficient reception gain of circularly polarized waves, diagonal lines on which said diagonally opposing parts oppose being inclined substantially by ±45 degrees with respect to a latitudinal line passing through the center of the aperture, and said apertures in each pair being disposed to be mutually rotated at said diagonal lines of the diagonally opposing parts by an angle in a rotating direction of a circular polarization plane, wherein said apertures of said radiation plate include apertures which, at said diagonally opposing parts, include portions of said radiation plate material which cover portions of said power supplying conductor pattern other than said power supply terminals on said power supply plate where said portions of said supplying conductor pattern are exposed through the diagonally opposing parts of the apertures as seen in plan view, for prevention of re-radiation at said portions of said power supplying conductor pattern.

* * * * *